(12) United States Patent
Kim et al.

(10) Patent No.: US 11,355,979 B2
(45) Date of Patent: Jun. 7, 2022

(54) MOTOR

(71) Applicant: LG Electronics Inc., Seoul (KR)

(72) Inventors: Jaeho Kim, Seoul (KR); Minsoo La, Seoul (KR); Hyuk Nam, Seoul (KR); Kyungmo Yu, Seoul (KR); Sangyoung Cho, Seoul (KR); Kyungho Ha, Seoul (KR); Pangeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 16/696,311

(22) Filed: Nov. 26, 2019

(65) Prior Publication Data
US 2020/0169132 A1    May 28, 2020

(30) Foreign Application Priority Data

Nov. 26, 2018    (KR) .......................... 10-2018-0147665
Nov. 26, 2018    (KR) .......................... 10-2018-0147666
(Continued)

(51) Int. Cl.
*H02K 1/30*  (2006.01)
*H02K 1/27*  (2022.01)
(Continued)

(52) U.S. Cl.
CPC .............. *H02K 1/30* (2013.01); *H02K 1/276* (2013.01); *H02K 1/2766* (2013.01);
(Continued)

(58) Field of Classification Search
CPC .......... H02K 1/30; H02K 1/276; H02K 21/16; H02K 1/2766; H02K 1/2786; H02K 21/22;
(Continued)

(56) References Cited

U.S. PATENT DOCUMENTS

| 4,012,651 A | 3/1977 | Burson |
| 4,339,874 A | 7/1982 | Mc'Carty et al. |

(Continued)

FOREIGN PATENT DOCUMENTS

| CN | 1845427 | 10/2006 |
| CN | 101675188 | 3/2010 |

(Continued)

OTHER PUBLICATIONS

EP Office Action in European Appln. No. 19210107.9, dated Feb. 19, 2021, 7 pages.

(Continued)

*Primary Examiner* — Thomas Truong
(74) *Attorney, Agent, or Firm* — Fish & Richardson P.C.

(57) ABSTRACT

A motor includes a stator and a rotor. The rotor includes: a plurality of rotor core segments arranged along a circumferential direction of the rotor on the inner side or the outer side of the stator and spaced apart from one another to define a plurality of permanent magnet arrangement slots between the plurality of rotor core segments, a plurality of permanent magnets inserted into the plurality of permanent magnet arrangement slots, respectively, a rotor frame that couples the plurality of rotor core segments and the plurality of permanent magnets to each to other, and an outer ring that is made of a non-magnetic material and that surrounds an outer end of the plurality of rotor core segments and an outer end of the plurality of permanent magnets. The plurality of rotor core segments and the plurality of permanent magnets are alternately arranged along the circumferential direction of the rotor.

17 Claims, 8 Drawing Sheets

(30) Foreign Application Priority Data

Nov. 26, 2018 (KR) .................. 10-2018-0147667
Nov. 26, 2018 (KR) .................. 10-2018-0147669

(51) Int. Cl.

| | |
|---|---|
| *H02K 1/2786* | (2022.01) |
| *H02K 1/276* | (2022.01) |
| H02K 21/22 | (2006.01) |
| H02K 21/16 | (2006.01) |

(52) U.S. Cl.

CPC .......... *H02K 1/2786* (2013.01); *H02K 21/16* (2013.01); *H02K 21/22* (2013.01)

(58) Field of Classification Search

CPC .... H02K 15/03; H02K 15/12; H02K 2213/03; H02K 1/28; H02K 1/27

See application file for complete search history.

(56) References Cited

U.S. PATENT DOCUMENTS

| | | | |
|---|---|---|---|
| 5,786,650 | A | 7/1998 | Uchida et al. |
| 6,384,504 | B1 | 5/2002 | Ehrhart et al. |
| 9,590,459 | B2 | 3/2017 | Hoemann |
| 2003/0193254 | A1 | 10/2003 | Morimatsu |
| 2006/0091754 | A1 | 5/2006 | Kim et al. |
| 2010/0050702 | A1 | 3/2010 | Kim et al. |
| 2011/0175479 | A1 | 7/2011 | Marchitto |
| 2011/0187210 | A1 | 8/2011 | Marchitto |
| 2012/0043844 | A1 | 2/2012 | Bailey et al. |
| 2012/0286520 | A1 | 11/2012 | Booth |
| 2013/0061641 | A1 | 3/2013 | Yoon et al. |
| 2013/0119808 | A1 | 5/2013 | Hirokawa et al. |
| 2014/0070653 | A1 | 3/2014 | Lee et al. |
| 2014/0097718 | A1 | 4/2014 | Yukinori et al. |
| 2014/0102151 | A1 | 4/2014 | Yoon et al. |
| 2014/0152135 | A1* | 6/2014 | Jang ................. H02K 1/02 310/156.01 |
| 2014/0333168 | A1 | 11/2014 | Bouarroudj et al. |
| 2014/0361656 | A1 | 12/2014 | Legranger et al. |
| 2014/0375162 | A1 | 12/2014 | Kim et al. |
| 2015/0076933 | A1 | 3/2015 | Hoemann et al. |
| 2015/0380998 | A1 | 12/2015 | Hoemann |
| 2016/0156233 | A1* | 6/2016 | Yoon ................... H02K 1/2786 310/43 |
| 2017/0070107 | A1 | 3/2017 | Lee et al. |
| 2017/0170694 | A1 | 6/2017 | Bhargava et al. |
| 2018/0069443 | A1 | 3/2018 | Han et al. |
| 2019/0207446 | A1* | 7/2019 | Swales .................. H02K 1/278 |

FOREIGN PATENT DOCUMENTS

| | | |
|---|---|---|
| CN | 102035281 | 4/2011 |
| CN | 102163900 | 8/2011 |
| CN | 102738924 | 10/2012 |
| CN | 103053096 | 4/2013 |
| CN | 104285363 | 1/2015 |
| CN | 104393730 | 3/2015 |
| CN | 105474514 | 4/2016 |
| CN | 107733111 | 2/2018 |
| CN | 107735924 | 2/2018 |
| DE | 909472 | 4/1954 |
| EP | 0669699 | 8/1995 |
| EP | 1237252 | 9/2002 |
| EP | 2824800 | 1/2015 |
| EP | 2942858 | 11/2015 |
| EP | 3349332 | 7/2018 |
| JP | H07264793 | 10/1995 |
| JP | 2001095185 | 4/2001 |
| JP | 2003510998 | 3/2003 |
| JP | 2005261177 | 9/2005 |
| JP | 2012217269 | 11/2012 |
| JP | 2015080336 | 4/2015 |
| KR | 20120110275 | 10/2012 |
| KR | 1020130090165 | 8/2013 |
| KR | 20160112412 | 9/2016 |
| KR | 20170030022 | 3/2017 |
| KR | 20180020030 | 2/2018 |
| WO | WO2015009031 | 1/2015 |
| WO | WO2016132063 | 8/2016 |

OTHER PUBLICATIONS

European Office Action in European Application No. 19210101.2, dated Dec. 7, 2020, 12 pages.
Extended European Search Report in European Application No. 19210105.3, dated Apr. 7, 2020, 16 pages.
Extended European Search Report in European Application No. 19210101.2, dated Apr. 2, 2020, 13 pages.
Fofanov et al., "Magnetic properties stainless steel," Stahl, dated Jan. 1, 2013, 24 pages, XP055561965 (with English translation).
EP Extended European Search Report in European Appln No. 19210107.9, dated Apr. 15, 2020, 8 pages.
EP Extended European Search Report in European Appln No. 19210106.1, dated Apr. 14, 2020, 9 pages.
Office Action in U.S. Appl. No. 16/696,393, dated Jul. 9, 2021, 47 pages.
Office Action in U.S. Appl. No. 16/696,505, dated Jul. 16, 2021, 36 pages.
Office Action in Chinese Appln. No. 201911175236.8, dated Sep. 23, 2021, 23 pages (with English translation).
Office Action in Chinese Appln. No. 201911174705.4, dated Sep. 30, 2021, 16 pages (with English translation).
Office Action in Chinese Appln. No. 201911175262.0, dated Sep. 23, 2021, 15 pages (with English translation).
Office Action in Chinese Appln. No. 201911176293.8, dated Sep. 23, 2021, 17 pages (with English translation).
Office Action in U.S. Appl. No. 16/696,117, dated Nov. 26, 2021, 27 pages.
Office Action in U.S. Appl. No. 16/696,311, dated Nov. 26, 2021, 30 pages.

* cited by examiner

MOTOR

CROSS-REFERENCE TO RELATED APPLICATIONS

Pursuant to 35 U.S.C. § 119(a), this application claims the benefit of the earlier filing date and the right of priority to Korean Applications No. 10-2018-0147665, filed on Nov. 26, 2018, No. 10-2018-0147666, filed on Nov. 26, 2018, No. 10-2018-0147667, filed on Nov. 26, 2018 and No. 10-2018-0147669, filed on Nov. 26, 2018, the contents of which are incorporated by reference herein in their entirety.

TECHNICAL FIELD

The present disclosure relates to a motor.

BACKGROUND

A motor is a device that can provide a rotational force generated by electromagnetic interaction between a stator and a rotor to a rotation shaft. A coil may be wound on the stator to generate a rotational force, and the rotor may rotate when a current is applied to the coil. The motor may be used in various fields such as a washing machine, a refrigerator, a compressor, and a cleaner. For example, the motor may be connected to a drum of the washing machine by a rotation shaft to implement the rotation of the drum.

In some examples, permanent magnet type motors may be classified into surface mounted magnet types and interior permanent magnet types according to the attachment type of a permanent magnet. The surface mounted magnet type denotes a form in which a permanent magnet is attached to a surface of a rotor core. The interior permanent magnet type denotes a form in which a permanent magnet embedded in the rotor core. The interior permanent magnet types may include a spoke type in which the rotor core and the permanent magnet stand along a height direction parallel to an axial direction of the rotation shaft.

A spoke type motor may have an advantage in improving the efficiency and performance of the rotor through a magnetic flux concentration effect using to the rotor core. In some cases, when a rotational speed of the rotation shaft generated by the spoke type motor is excessively fast, there is a concern that the structural strength of the rotor is lowered. For example, during a spin-drying operation, the rotation shaft of the motor installed in a washing machine may rotate at a higher speed than the other operations, and the rotation speed may exceed 1,200 rpm.

In some cases, when the rotation shaft of the motor excessively rotates, a strong centrifugal force may act on the rotor of the motor. Furthermore, this strong centrifugal force may cause breakage in which the permanent magnet or rotor core in the rotor is separated in a radial direction of the rotor. In some examples, to mitigate such breakage, a motor may include a first fastening member disposed above and below a permanent magnet, and a second fastening member disposed to pass through the rotor core.

In some examples, when the rotation shaft of the motor rotates at a slow speed, the structure may prevent the permanent magnet and the rotor core from being disengaged using the two fastening members and the rotor housing. In some cases, the first fastening member, the second fastening member, and the rotor housing may be formed with individual parts, and thus when the rotation shaft of the motor rotates at a very high speed, the possibility of breakage occurrence may be very high due to an insufficient physical coupling force between each part.

In some cases, the first fastening members are disposed above and below the permanent magnet and the rotor core, respectively, which may increase the motor size.

In some cases, the rotor housing, the rotor core, the permanent magnet, the first fastening member, and the second fastening member may be sequentially assembled in a predetermined order. In this respect, the productivity may be very low, particularly as the number of fastening members increases, which is disadvantageous to mass production.

In some case, it may be difficult to improve the structural strength without a size increase or performance deterioration of the rotor rotating at a high speed by using structures such as the fastening members or the like.

SUMMARY

When a structural strength of a rotor is to be reinforced by introducing structures such as fastening members or the like, the process of forming holes in a rotor core segment to insert fastening members and fastening the fastening members may be carried out. When the size of a fastening member is increased in order to increase the rigidity of the fastening member, the size of a rotor core segment may be inevitably reduced, thereby resulting in a size increase of the motor and performance deterioration of the motor. The present disclosure describes one or more techniques to improve the performance of a motor and decrease or maintain a size of the motor. Accordingly, the present disclosure describes a structure capable of improving the structural strength of a motor without causing performance degradation or a size increase of the motor.

In some cases, when a connection strength between the fastening members is insufficient, a strong centrifugal force acting on a rotor during a high-speed operation of a motor may cause a breakage of the rotor. In particular, considering that the need for a motor operating at a high speed in various devices such as a washing machine, a cleaner, or the like is continuously increasing, it is not sufficient to secure the structural strength only during a low-speed operation. Accordingly, the present disclosure provides a motor having a structure capable of preventing a permanent magnet and a rotor core segment from being damaged in a radial direction due to a strong centrifugal force acting on a rotor even during a high-speed operation of the motor. In addition, the present disclosure also presents a structure capable of prevent a breakage of a motor caused due to an insufficient physical coupling force between the individual parts.

The present disclosure also describes a structure capable of improving the productivity of a motor through integration of parts to improve the structural strength of a rotor through the introduction of fastening members.

The present disclosure also presents a configuration in which a rotor core segment and a permanent magnet are stably mounted in place on a rotor frame during the process of producing a motor to securely maintain a coupling state.

According to one aspect of subject matter described in this application, a motor includes a stator and a rotor rotatably disposed on an inner side of the stator or an outer side of the stator. The rotor includes a plurality of rotor core segments arranged along a circumferential direction of the rotor on the inner side or the outer side of the stator and spaced apart from one another to define a plurality of permanent magnet arrangement slots between the plurality of rotor core segments, a plurality of permanent magnets inserted into the plurality of permanent magnet arrangement slots, respectively, where the plurality of rotor core segments and the plurality of permanent magnets are alternately arranged along the circumferential direction of the rotor, a rotor frame that couples the plurality of rotor core segments and the plurality of permanent magnets to each other, and an outer ring that is made of a non-magnetic material and that surrounds an outer end of the plurality of rotor core segments and an outer end of the plurality of permanent magnets.

Implementations according to this aspect may include one or more of the following features. For example, a relative permeability of the outer ring may be 1 to 1.05. In some examples, a thickness of the outer ring between an inner circumferential surface and an outer circumferential surface of the rotor frame may be 0.5 mm to 3.5 mm. In some examples, the rotor frame may be connected to a rotation shaft that passes through the stator in an axial direction, and a ratio of a length of the outer ring in the axial direction with respect to a length of the plurality of rotor core segments in the axial direction may be 0.3 to 1.5. In some examples, the ratio of the length of the outer ring with respect to the length of the plurality of rotor core segments in the axial direction may be 0.66 to 1.

In some implementations, the outer ring may include a band that has a first end and a second end and that is wound along the outer end of the plurality of rotor core segments and the outer end of the plurality of permanent magnets. In some examples, the first end and the second end of the band may be coupled to each other by welding. In some examples, each of the first end and the second end of the band may include a circumferential protruding portion that protrudes in a circumferential direction of the outer ring toward a mating end among the first end and the second end, and an intersectional protruding portion that protrudes from the circumferential protruding portion in a direction intersecting the circumferential direction of the outer ring. In some implementations, the intersectional protruding portion of the first end and the intersectional protruding portion of the second end may be coupled to each other and overlap each other in the circumferential direction of the outer ring and in the direction intersecting the circumferential direction of the outer ring.

In some implementations, the outer ring may be in contact with the outer end of the plurality of rotor core segments and the outer end of the plurality of permanent magnets, and the rotor frame may surround the outer ring. In some examples, the plurality of rotor core segments, the plurality of permanent magnets, and the outer ring may be integrated with the rotor frame by injection molding. In some examples, the rotor frame may be connected to a rotation shaft that passes through a region surrounded by the stator. The outer ring may have an upper end and a lower end opposite to the upper end in an axial direction of the rotation shaft, and the rotor frame may extend along the axial direction of the rotation shaft to thereby cover the upper end and the lower end of the outer ring.

In some examples, the plurality of rotor core segments may have upper ends and lower ends opposite to the upper ends of the plurality of rotor core segments in the axial direction of the rotation shaft, and the plurality of permanent magnets may have upper ends and lower ends opposite to the upper ends of the plurality of magnets in the axial direction of the rotation shaft. The rotor frame may cover the upper ends and lower ends of the plurality of rotor core segments and the upper ends and lower ends of the plurality of permanent magnets in the axial direction of the rotation shaft.

In some implementations, each of the plurality of rotor core segments may define a rotor core hole or a rotor core slot, the rotor core hole or the rotor core slot being configured to receive a portion of the rotor frame. The rotor frame may include a rotor frame pin inserted into the rotor core hole or the rotor core slot along the axial direction of the rotation shaft, and the rotor frame may define a rotor frame hole at a position facing the rotor frame pin in the axial direction of the rotation shaft.

In some implementations, the rotor frame may be in contact with the outer end of the plurality of rotor core segment and the outer end of the plurality of permanent magnets, and the outer ring may surround the rotor frame.

In some implementations, each of the plurality of rotor core segments may include: a body that faces two adjacent magnets of the plurality of permanent magnets in the circumferential direction of the rotor; a head that protrudes from an inner end of the body to both sides along the circumferential direction of the rotor; and core protrusions that protrude radially outward from an outer end of the body and that are spaced apart from each other in the circumferential direction of the rotor to thereby define a rotor core slot between the core protrusions. Each of the plurality of permanent magnet arrangement slots may be defined by the bodies, the heads, and the core protrusions of adjacent rotor core segments of the plurality of rotor core segments, the adjacent rotor core segments being disposed on both sides of one of the plurality of permanent magnets.

In some implementations, each of the plurality of permanent magnets may be disposed between two adjacent rotor core segments of the plurality of rotor core segments arranged along the circumferential direction of the rotor.

According to another aspect, a motor includes a stator and a rotor rotatably disposed at an outer side of the stator. The rotor includes: a plurality of rotor core segments arranged along a circumferential direction of the rotor on the outer side of the stator and spaced apart from one another to define a plurality of permanent magnet arrangement slots between the plurality of rotor core segments, a plurality of permanent magnets inserted into the plurality of permanent magnet arrangement slots, respectively in which each of the plurality of permanent magnets is disposed between two adjacent rotor core segments of the plurality of rotor core segments arranged along the circumferential direction of the rotor, and an outer ring that surrounds an outer end of the plurality of rotor core segments and an outer end of the plurality of permanent magnets. An inner surface of the outer ring is in contact with the outer end of the plurality of rotor core segments and the outer end of the plurality of permanent magnets.

Implementations according to this aspect may include one or more of the following features or the features described above. For example, the motor may further include a rotor frame that surrounds the outer ring, that is coupled to the plurality of rotor core segments and the plurality of permanent magnets, and that is in contact with an outer surface of the outer ring. In some implementations, the rotor frame may include a base that extends radially inward of the outer ring to thereby cover upper ends or lower ends of the plurality of rotor core segments.

BRIEF DESCRIPTION OF THE DRAWING

The accompanying drawings, which are included to provide a further understanding of the disclosure and are incorporated in and constitute a part of this specification, illustrate one or more implementations of the disclosure and together with the description serve to explain the principles of the disclosure.

DETAILED DESCRIPTION

Figure 1:
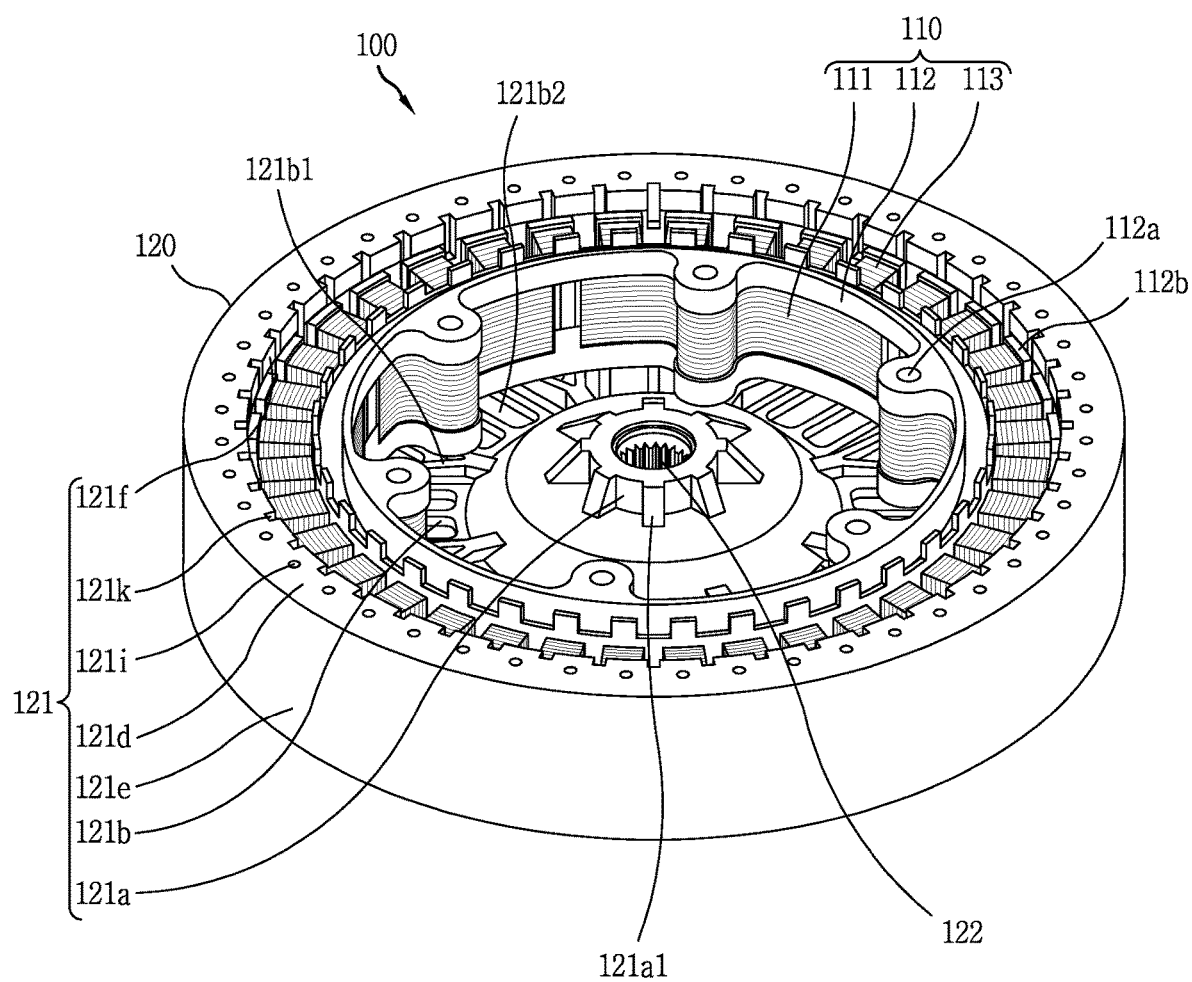
FIG. 1 is a perspective view showing an example motor.

Hereinafter, a motor will be described in more detail with reference to the accompanying drawings.

The same or similar reference numerals may be designated to the same or similar configurations, and the description thereof will be substituted by the earlier description.

FIG. 1 is a perspective view showing an example of a motor 100. The motor 100 may include a stator 110 and a rotor 120. The stator 110 may include a stator core 111, an insulator 112, and a coil 113.

In some implementations, the stator core 111 may be formed by stacking a plurality of electrical steel sheets (magnetic bodies) along an axial direction of a rotation shaft coupled to the motor 100. The stator core 111 may surround the rotation shaft at a position spaced apart from the rotation shaft.

In some implementations, the insulator 112 may be coupled to the stator core 111 at one side and the other side (e.g., upper and lower sides) along a direction parallel to an axial direction of the rotation shaft (in a vertical direction in FIG. 1). The insulator 112 may be made of an electrically insulating material. The insulator 112 may have a stator fixing portion 112a and a teeth insulation portion 112b.

The stator fixing portion 112a may protrude from a circumference of the insulator 112 toward the rotation shaft. The plurality of stator fixing portions 112a are formed. The plurality of stator fixing portions 112a may be disposed at positions spaced apart from each other along the circumference of the insulator 112. The stator fixing portion 112a may define a fastening member fixing hole to be open toward a direction parallel to an axial direction of the rotation shaft. The position of the stator 110 is fixed as the fastening member is coupled to the fastening member fixing hole.

The teeth insulation portion 112b may protrude radially from the circumference of the insulator 112. The teeth insulation portion 112b insulates the coil 113 from teeth connected to a yoke by surrounding the teeth surrounded by the coil 113.

The coil 113 is wound on each teeth insulation portion 112b. Concentrated winding is shown in FIG. 1. A current is applied to the coil 113. The motor 100 is operated by the current applied to the coil 113.

The rotor 120 is rotatably disposed on an inner or outer side of the stator 110. The inner and outer sides are determined whether it faces toward the rotation shaft disposed at the center in a radial direction of the rotor 120 or faces toward an opposite direction thereof. The direction toward the rotation shaft is an inner side, and the direction away from the rotation shaft is an outer side. In FIG. 1, the rotor 120 shows an outer rotor 120 disposed on an outer side of the stator 110.

The rotor 120 includes a rotor frame 121. The rotor frame 121 may also be referred to as a rotor housing. The rotor frame 121 may surround the stator 110.

The rotor frame 121 includes a bushing coupling portion 121a, a spoke 121b, and an outer wall 121e.

The bushing coupling portion 121a may engage with a rotation shaft passing through a region surrounded by the stator 110. The bushing coupling portion 121a may be located at the center of the rotor frame 121 in a radial direction of the rotor 120. The center of the rotor frame 121 corresponds to a position facing the region surrounded by the stator 110.

The bushing coupling portion 122a may engage with the bushing 122. The bushing 122 refers to a part connected to the rotation shaft. One end of the rotation shaft may be coupled to the bushing 122, and the other end may be directly connected to an object to be supplied with a rotational force of the motor 100, such as a drum of the washing machine.

The bushing 122 may have a shape similar to a hollow cylinder. The bushing 122 has threads 122a on an inner circumferential surface of the hollow so as to engage with the rotation shaft. The rotation shaft is inserted directly into the bushing 122. The rotation shaft and the rotor frame 121 are coupled to each other through the bushing 122.

A reinforcing rib 122a1 is formed around the bushing coupling portion 122a. A plurality of reinforcing ribs 122a1 are formed around the bushing coupling portion 122a, and a plurality of reinforcing ribs 122a1 are protruded from a boundary between the bushing coupling portion 122a and the spokes 122b along a direction inclined to the rotation shaft.

The spokes 121b may extend in a radial direction from the bushing coupling portion 121a or extends toward a direction inclined at an acute angle with respect to the radial direction. A plurality of spokes 121b are provided therein, and may be arranged around the bushing coupling portion 121a so as to face different directions. The spokes 121b may be disposed at positions covering one side or the other side of the stator 110 in a direction parallel to an axial direction of the rotation shaft. With reference to FIG. 1, a lower side of the stator 110 corresponds to the one side, and an upper side of the stator 110 corresponds to the other side. In this case, the spoke 121b may be located at a position covering a lower side of the stator 110 from below.

When a plurality of spokes 122b are formed in a radial direction around the bushing coupling portion 122a, a heat dissipation hole 122b1 may be located between the plurality of spokes 122b. Heat generated from the motor due to the operation of the motor may be discharged through the heat dissipation hole 122b1.

The outer wall 121e may surround the stator 110 in a radial direction of the rotor 120. A plurality of rotor core segments 123 and a plurality of permanent magnets 124 to be described later are installed on an inner side of the outer wall 121e.

FIG. 1 illustrates a spoke type motor 100 including a spoke 121b and the outer rotor 120, but the present disclosure is not limited to the spoke type motor 100 including the spoke 121b and the outer rotor 120. For instance, the present disclosure may be applicable to an interior permanent magnet type motor having an inner rotor 120.

Figure 2:
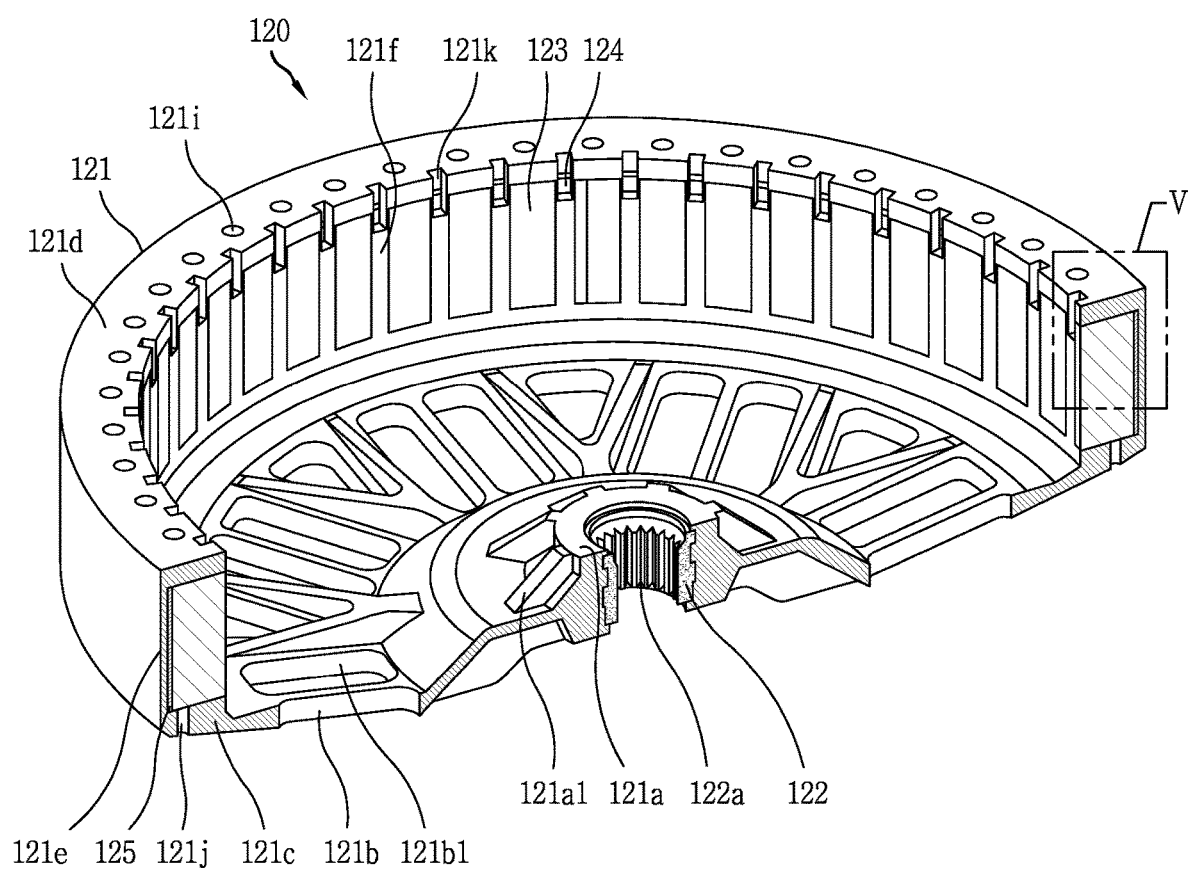
FIG. 2 is a perspective view showing an example rotor illustrated in FIG. 1 cut along an axial direction.

Elements with reference numerals that are not described in FIG. 1 will be described with reference to FIG. 2 illustrating only the rotor 120 excluding the stator 110.

FIG. 2 is a perspective view showing a state in which the rotor 120 illustrated in FIG. 1 is cut along an axial direction.

Figure 3:
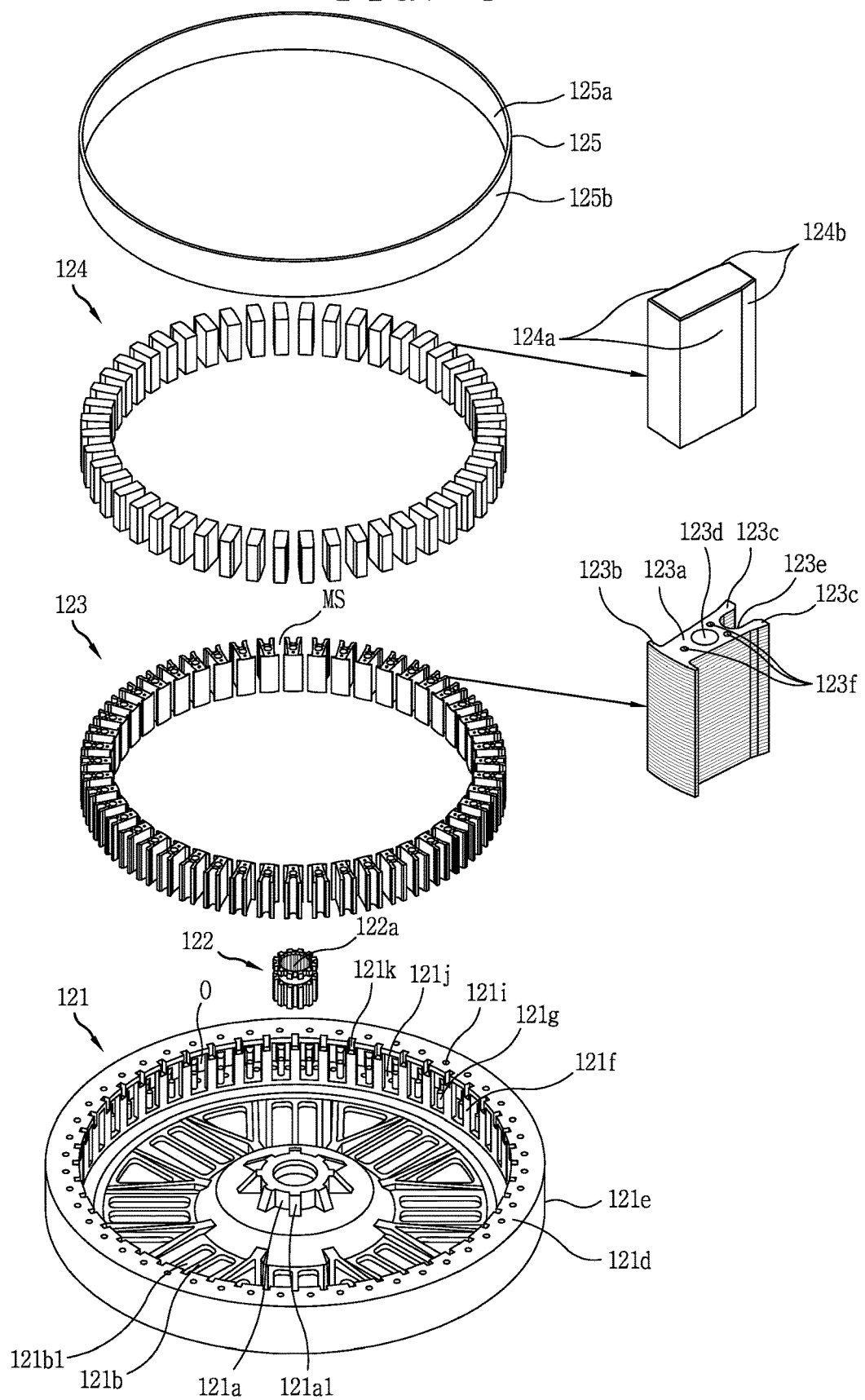
FIG. 3 is an exploded perspective view of the rotor of FIG. 1.

FIG. 3 is an exploded perspective view of the rotor 120.

Figure 4:
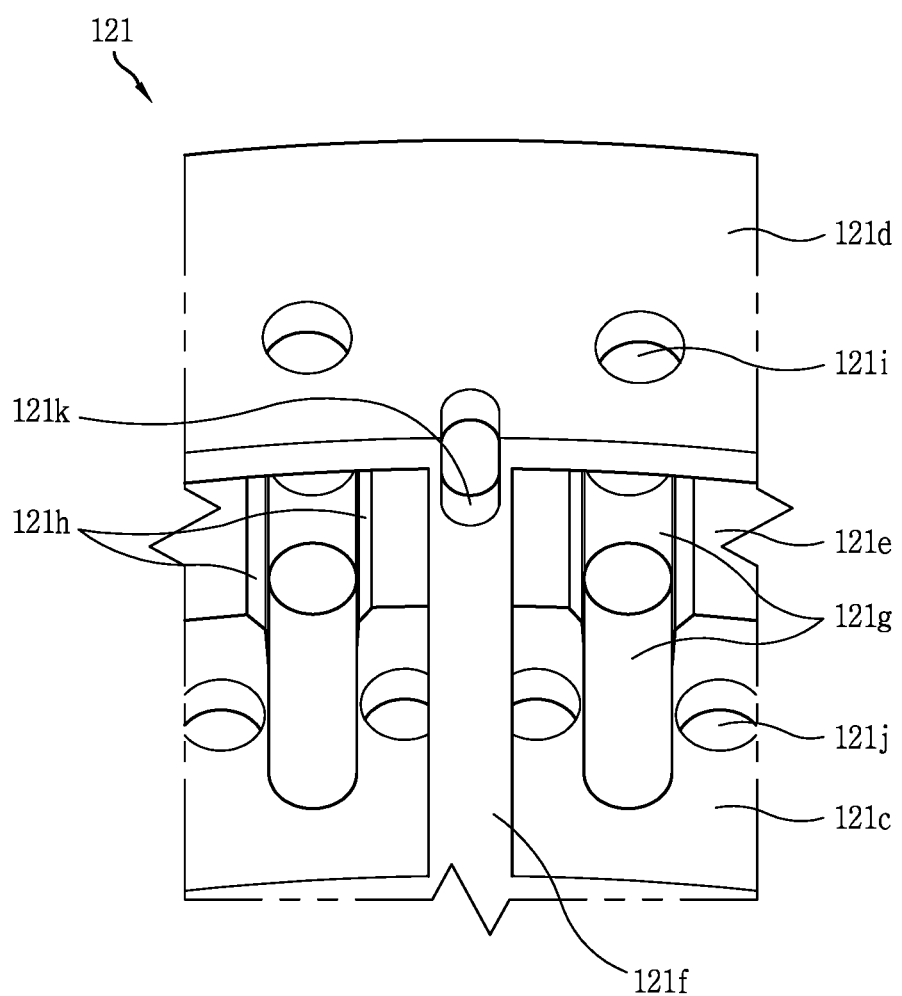
FIG. 4 is an enlarged partial perspective view showing example portions of an example rotor frame illustrated in FIG. 3.

FIG. 4 is an enlarged partial perspective view showing a portion IV illustrated in FIG. 3.

The rotor 120 includes a plurality of rotor cores (or rotor core segments, or rotor core blocks) 123, a plurality of permanent magnets 124, and a rotor frame 121.

The plurality of rotor core segments 123 are arranged apart from each other along a circumferential direction of the rotor 120 on an outer side of the stator 110 to form permanent magnet arrangement slots (MS). As the plurality of rotor core segments 123 are arranged apart from each other along a circumferential direction of the rotor 120, permanent magnet arrangement slots (MS) are formed between the two rotor core segments 123. A permanent magnet arrangement slot (MS) is a region surrounded by a side surface of the two rotor core segments 123, a head 123b of the two rotor core segments 123, and a protrusion 123c of the two rotor core segments 123 disposed adjacent to the permanent magnet arrangement slot (MS).

The plurality of rotor core segments 123 are formed by stacking a plurality of single electric steel sheets (magnetic bodies) along a direction parallel to an axial direction of the rotation shaft. The single electrical steel sheets may have the same shape. However, at least one electric steel sheet disposed at a lower end and at least one electric steel sheet disposed at an upper end with respect to the stacking direction of the electric steel sheets may be larger than other electric steel sheets to support the permanent magnet 124.

For example, seventy eight electrical steel sheets may be stacked to construct the rotor core segment 123 having a height of 39 mm with a single electrical steel sheet having a thickness of 0.5 mm in a direction parallel to an axial direction of the rotation shaft.

The rotor core segment 123 performs the role of concentrating a force of the permanent magnets 124. When the force of the permanent magnet 124 is concentrated on the rotor core segment 123, the performance of the motor 100 dramatically increases. However, when the plurality of rotor core segments 123 are connected to each other, the efficiency of the motor 100 is reduced. In some implementations, in order to improve the efficiency of the motor 100, the plurality of rotor core segments 123 may be spaced from each other.

Referring to FIG. 3, each rotor core segment 123 includes a body 123a, a head 123b, a protrusion 123c, a rotor core hole 123d, a rotor core slot 123e, and a mac 123f.

The body 123a corresponds to a portion occupying the largest volume of the rotor core segment 123. The body 123a is disposed to face the permanent magnet 124 in a circumferential direction of the rotor 120. Both side surfaces of the body 123a are disposed to face a first working surface 124a of the permanent magnet 124, and are in surface contact with the first working surface 124a.

It will be understood that the plurality of rotor core segments 123 are arranged along a side face of the hollow cylinder. A portion located on a circumference corresponding to an inner diameter of the cylinder corresponds to an inner end of the body 123a. Furthermore, an outer end of the body 123a indicates a portion formed with the protrusion 123c and the rotor core slot 123e to be described later. The inner end of the body 123a is disposed to face the stator 110 at a position spaced apart from the stator 110.

A width of the body 123a with respect to a circumferential direction of the rotor 120 may be formed to gradually increase from the inner end to the outer end of the body 123a. For instance, a linear distance between both side surfaces of the body 123a in a circumferential direction of the rotor 120 gradually increases from the inner end to the outer end of the body 123a.

When an imaginary first circumference corresponding to an inner end of the rotor core segment 123 is compared with an imaginary second circumference corresponding to an outer end of the rotor core segment 123, the second circumference is larger than the first circumference. When the first working surface 124a of the permanent magnet 124 may extend along a direction parallel to a radial direction of the rotor 120, an area based on a difference between the first circumference and the second circumference may be filled by the rotor core segment 123. A width of the body 123a with respect to a circumferential direction of the rotor 120 to fill the area may gradually increase from the inner end to the outer end. Accordingly, the plurality of rotor core segments 123 and the plurality of permanent magnets 124 in a circumferential direction of the rotor 120 may be arranged without a hollow space.

The head 123b may protrude from an inner end of the body 123a to both sides thereof toward a circumferential direction of the rotor 120. A single rotor core segment 123 may include two heads 123b.

Two heads 123b may be disposed at positions facing an inner surface of the permanent magnet 124 with respect to a single permanent magnet 124. The two heads 123b restrict the movement of the permanent magnet 124 toward the rotation shaft. Either one of the two heads 123b corresponds to a head 123b of the rotor core segment 123 disposed on one side of the permanent magnet 124, and the other one corresponds to a head 123b of the rotor core segment 123 disposed on the other side of the permanent magnet 124.

The two heads 123b are disposed apart from each other in a circumferential direction of the rotor 120. When the two heads 123b are connected to each other, the performance of the motor 100 is deteriorated. In order to maximize the performance of the motor 100, in some implementations, all the rotor core segments 123 are spaced apart from each other and all the permanent magnets 124 are spaced apart from each other. In some implementations, from the viewpoint of the performance of the motor 100, the two heads 123b may be also spaced from each other.

The protrusion 123c may protrude from an outer end of the body 123a. The protrusion 123c may extend in two directions toward a direction away from each other to form the rotor core slot 123e. One rotor core segment 123 may include two protrusions 123c. The two protrusions 123c are protruded toward a direction inclined to a radial direction of the rotor 120. Both side surfaces of the protrusion 123c are arranged to face the second working surface 124b of the permanent magnet 124, and are in surface contact with the second working surface 124b.

Two protrusions 123c may be disposed at a position facing an outer surface of one permanent magnet 124 with respect to the permanent magnet 124. The two protrusions 123c restrain the permanent magnet 124 that is about to move toward a direction away from the rotation shaft due to a centrifugal force during the operation of the motor 100. Either one of the two protrusions 123c corresponds to a protrusion 123c of the rotor core segment 123 disposed on one side of the permanent magnet 124, and the other one of the two protrusions 123c corresponds to a protrusion 123c disposed on the other side of the permanent magnet 124.

The two protrusions 123c may be disposed apart from each other in a circumferential direction of the rotor 120. In some cases, when the two protrusions 123c are connected to each other, the performance of the motor 100 may be deteriorated. In some implementations, to maximize the performance of the motor 100, all the rotor core segments 123 may be spaced apart from each other and all the permanent magnets 124 are spaced apart from each other. In some implementations, for the performance of the motor 100, the two protrusions 123c may be also spaced apart from each other.

In some examples, the rotor core hole 123d may be defined in the body 123a. The rotor core hole 123d is open toward a direction parallel to an axial direction of the rotation shaft (in a vertical direction in FIGS. 2 and 3). The rotor core hole 123d may be located between inner and outer ends of the body 123a in a radial direction of the rotor 120. The rotor core slot 123e may be located at an outer end of the body 123a, and thus the hole may be located between an inner end of the body 123a and the rotor core slot 123e in a radial direction of the rotor 120.

The rotor core slot 123e may be located between the two protrusions 123c in a circumferential direction of the rotor 120. It will be understood that the rotor core slot 123e has a shape recessed toward the body 123a between the two protrusions 123c with respect to a radial direction of the rotor 120. A circumference of the rotor core slot 123e may include a curved surface having a cross section of a semicircle or a shape similar to a semicircle.

The rotor core hole 123d and the rotor core slot 123e are regions accommodating a mold pin in an insert injection molding process to be described later or accommodating a molten injection material. For insert injection molding, the plurality of rotor core segments 123 may be seated in a mold, and the plurality of rotor core segments 123 may be fixed in place in the mold. A plurality of mold pins are formed in the mold to fix each rotor core segment 123 in place. When the rotor core segment 123 is placed in the mold to insert each of the mold pins into the rotor core hole 123d or the rotor core slot 123e, the fixing of each rotor core segment 123 is completed.

When the plurality of rotor core segments 123 are seated in place in the mold using the mold pins, and them the molten injection material is injected into the mold, the injection material is filled into the rotor core holes 123d and the rotor core slots 123e. When insert injection molding is completed and an injection product (molded article) is separated from the mold, the rotor core hole 123d and the rotor core slot 123e remain in a region where the mold pin has been present. The rotor frame pin 121g and the pin reinforcing rib 121h, to be described later, are formed in a region filled with the injection material.

The mac 123f may be defined at each single electrical steel sheet of each rotor core segment 123. The mac 123f may be a dimple that is recessed in one side of each steel sheet and protrudes from the other side of each steel sheet. For example, the mac 123f may protrude from one surface of each electrical steel sheet, and may have a protruding shape that is recessed from the other surface at the same position as the protruding position. A plurality of macs 123f may be disposed around the rotor core holes 123d. For example, FIG. 3 illustrates three macs 123f defined on each electrical steel sheet.

The mac 123f is a structure for aligning and stacking single electrical steel sheets at positions corresponding to each other. When a plurality of electric steel sheets are stacked in such a manner that either one protruded mac 123f between the two electric steel sheets disposed to face each other is inserted into the other recessed mac 123f, the electrical steel sheets constituting the rotor core segment 123 may be aligned with each other along a direction parallel to an axial direction of the rotation shaft.

The plurality of rotor core segments 123 are exposed on an inner side of the rotor 120 in a radial direction of the rotor 120. Here, the inner side of the rotor 120 refers to a position at which the bushing 122 is installed.

An outer ring 125, to be described later, is in close contact with an outer end of the rotor core segment 123.

The plurality of permanent magnets 124 may be inserted one by one into the permanent magnet arrangement slots (MS) formed by the plurality of rotor core segments 123 so as to be arranged along a circumferential direction of the rotor 120. The plurality of permanent magnets 124 and the plurality of rotor core segments 123 are alternately arranged one by one, and thus the same number of permanent magnets 124 and the rotor core segments 123 are provided in the rotor 120.

Each permanent magnet 124 has a first working surface 124a and a second working surface 124b. The magnetic field lines of the permanent magnet 124 are generated from the first working surface 124a and the second working to surface 124b.

The first working surface 124a corresponds to the largest surface of the permanent magnet 124. The first working surface 124a faces a circumferential direction of the rotor 120. The first working surface 124a may be parallel to a radial direction of the rotor 120. The first working surface 124a faces a side surface of the body 123a in a circumferential direction of the rotor 120. The first working surface 124a is in surface contact with a side surface of the body 123a.

The second working surface 124b forms a boundary at an obtuse angle with the first working surface 124a. When the second working surface 124b forms a boundary at an obtuse angle with the first working surface 124a, the second working surface 124b may be inclined to a radial direction of the rotor 120. In some examples, a direction toward the rotation shaft may be referred to as an inner direction of the rotor 120, and a direction away from the rotation shaft may be referred to as an outer direction of the rotor 120. The second working surface 124b is formed in an outer direction of the rotor 120 compared to the first working surface 124a. That is, the second working surface 124b may be disposed radially outward of the first working surface 124a.

In some implementations, the first working surface 124a and the second working surface 124b may define an obtuse angle at an interface or boundary, and an edge may be located at the boundary between the first working surface 124a and the second working surface 124b. The edge may extend parallel to an axial direction of the rotation shaft.

When the first working surface 124a and the second working surface 124b form a boundary at an obtuse angle, a width of the permanent magnet 124 based on a circumferential direction of the rotor 120 gradually decreases from a boundary between the first working surface 124a and the second working surface 124b to an outer end of the permanent magnet 124. An outer end of the permanent magnet 124 being gradually decreased by the second working surface 124b corresponds to a gradually increasing protrusion 123c of the rotor core segment 123.

When the plurality of permanent magnets 124 are seen from an inner side of the rotor 120 with respect to a radial direction of the rotor 120, the plurality of permanent magnets 124 are covered by the plurality of rotor core segments 123 and an inner pillar 121f of the rotor frame 121. Furthermore, when the plurality of permanent magnets 124 are seen from an outer side of the rotor 120, the plurality of permanent magnets 124 are covered by the outer wall 121e of the rotor frame 121. Here, the inner side of the rotor 120 refers to a position at which the bushing 122 is installed. Furthermore, the outer side of the rotor 120 refers to a position corresponding to an opposite side of the bushing 122 in a radial direction with respect to the plurality of rotor core segments 123 or the plurality of permanent magnets 124.

Each of the plurality of rotor core segments 123 and the plurality of permanent magnets 124 has a first end and a second end in a direction parallel to an axial direction of the rotation shaft. Here, the first end refers to a lower end of the plurality of rotor core segments 123, and a lower end of the plurality of permanent magnets 124, with respect to a direction illustrated in FIG. 2. Furthermore, the second end refers to an upper end of the plurality of rotor core segments 123, and an upper end of the plurality of permanent magnets 124.

However, ordinal numbers, first and second, do not have a special meaning in the ordinal number in that they are added to distinguish each other. Therefore, the upper end of the plurality of rotor core segments 123 and the upper end of the plurality of permanent magnets 124 may be also referred to as a first end. In addition, the lower end of the plurality of rotor core segments 123 and the lower end of the plurality of permanent magnets 124 may be also referred to as a second end.

The detailed structure of the rotor frame 121 will be described with reference to FIGS. 2 through 4.

The rotor frame 121 is connected to the rotation shaft through the bushing 122 installed at the bushing coupling portion 121a at a position facing the center of the stator 110. The rotor frame 121 is configured to fix the plurality of rotor core segments 123 and the plurality of permanent magnets 124. When the plurality of rotor core segments 123 and the plurality of permanent magnets 124 are inserted into the mold to form the rotor frame 121, the rotor frame 121 is integrated with the plurality of rotor core segments 123 and the plurality of permanent magnets 124.

Here, the meaning of being integrated denotes that a single body is formed by insert injection molding, to be described later. The assembly may be formed by sequentially combining parts with one another and disassembled in the reverse order of the combination. In some examples, the integrated body does not have the concept of assembly or disassembly and therefore differs from the assembly in that it is not disassembled unless damaged at discretion.

The rotor frame 121 may have a cylindrical shape having a hollow portion and a bottom surface. The rotor frame 121 may include a bushing coupling portion 121a, a spoke 121b, a first end base 121c, a second end base 121d, an outer wall 121e, a plurality of inner pillars 121f, a rotor frame pin 121g, a pin reinforcing rib 121h, a rotor frame hole 121i, a plurality of rotor core fixing jig holes 121j, and a plurality of permanent magnet fixing jig holes 121k.

The bushing coupling portion 121a and the spoke 121b have been described above with reference to FIG. 1.

The first end base 121c may have an annular shape so as to cover a first end of the plurality of rotor core segments 123 and a first end of the plurality of permanent magnets 124. The first end base 121c is formed on an outer circumference of the spokes 122b. The first end base 121c covers the first end of the plurality of rotor core segments 123 and the first end of the plurality of permanent magnets 124 in a direction (at a lower side) parallel to an axial direction of the rotation shaft. The first end base 121c supports the first end of the plurality of rotor core segments 123 and the first end of the plurality of permanent magnets 124.

The second end base 121d is formed in an annular shape so as to cover a second end of the plurality of rotor core segments 123 and a second end of the plurality of permanent magnets 124. The second end base 121d covers the second end of the plurality of rotor core segments 123 and the second end of the plurality of permanent magnets 124 in a direction (at an upper side) parallel to an axial direction of the rotation shaft. The second end base 121d supports the second end of the plurality of rotor core segments 123 and the second end of the plurality of permanent magnets 124.

The first end base 121c and the second end base 121d may be disposed at positions spaced from each other in a direction parallel to an axial direction of the rotation shaft. The first end base 121c and the second end base 121d are disposed to face each other in a direction parallel to an axial direction of the rotation shaft. The movement of the plurality of rotor core segments 123 and the movement of the plurality of permanent magnets 124 in a direction parallel to an axial direction of the rotation shaft is prevented by the first end base 121c and the second end base 121d.

The outer wall 121e may surround the protrusions 123c of the plurality of rotor core segments 123 and the outer ends of the plurality of permanent magnets 124 in a radial direction of the rotor 120. As will be described later, the rotor frame pin 121g is inserted into the rotor core slot 123e, and the outer wall 121e is inserted into the rotor core segment 123 and an outer side of the rotor frame pin 121g in a radial direction of the rotor 120. For instance, the outer wall 121e may extend in a direction parallel to an axial direction of the rotation shaft so as to connect the first end base 121c and the second end base 121d to each other, and extended along an outer end of the first end base 121c and an outer end of the second end base 121d.

The outer wall 121e may be located at the outermost of the rotor frame 121. Therefore, the plurality of rotor core segments 123 and the plurality of permanent magnets 124 are all covered by the outer wall 121e on an outer side of the rotor 120.

The plurality of inner pillars 121f are extended in a direction parallel to an axial direction of the rotation shaft so as to connect an inner end of the first end base 121c and an inner end of the second end base 121d to each other. Here, the inner end refers to a circumferential portion corresponding to an inner diameter of the rotor frame 121.

The plurality of inner pillars 121f may be disposed at positions spaced apart from each other along a circumferential direction of the rotor frame 121. Here, the circumferential direction of the rotor frame 121 refers to a circumferential direction of the inner end of the first end base 121c and/or a circumferential direction of the inner end of the second end base 121d.

Since the plurality of inner pillars 121f are spaced apart from each other, an opening (O) is formed for each region defined by the inner end of the first end base 121c, the inner end of the second end base 121d, and the inner pillar 121f.

The inner end of the plurality of rotor core segments 123 are exposed in a radial direction of the rotor 120 through the opening (O). The inner end of the rotor core segment 123 refers to an inner end of the body 123a. The inner end of the rotor core segment 123 exposed in a radial direction of the rotor 120 faces the stator 110.

Referring to FIG. 2, the plurality of rotor core segments 123 and the plurality of inner pillars 121f are alternately formed one by one along a circumferential direction of the first frame 121. Furthermore, the plurality of permanent magnets 124 are covered by the plurality of rotor core segments 123 and the plurality of inner pillars 121f in a radial direction of the first frame 121. The head 123b of each rotor core segment 123 and each inner pillar 121f are in surface contact with each other in an inclined direction with respect to a radial direction of the rotor frame 121. Accordingly, the plurality of inner pillars 121f support the plurality of rotor core segments 123 in a radial direction. Furthermore, the movement of the plurality of rotor core segments 123 toward an inner side of the rotor frame 121 (toward the rotation shaft) is prevented by the plurality of inner pillars 121f.

A plurality of rotor frame pins 121g are protruded from the first end base 121c toward the second end base 121d. The plurality of rotor frame pins 121g are extend along a direction parallel to an axial direction of the rotation shaft. In some cases, the plurality of rotor frame pins 121g may also be protruded from the second end base 121d toward the first end base 121c.

The plurality of rotor frame pins 121g are formed between an inner end of the first end base 121c and the outer wall 121e in a radial direction of the rotor frame 121. Furthermore, the plurality of rotor frame pins 121g may be formed at positions spaced apart from each other along a circumferential direction of the rotor frame 121. Two or more rotor frame pins 121g may also be formed in the same radial direction.

When two or more rotor frame pins 121g are formed in the same radial direction, any one may be located at a position relatively away from the outer wall 121e and the other one may be located at a position relatively close to the outer wall 121e. The rotor frame pin 121g formed at a position relatively away from the outer wall 121e is inserted into the rotor core hole 123d of the rotor core segment 123.

The pin reinforcing rib 121h for reinforcing connection strength with the outer wall 121e may be formed around the rotor frame pin 121g formed relatively close to the outer wall 121e in the same radial direction. The pin reinforcing ribs 121h may be formed on both sides of each rotor frame pin 121g. The pin reinforcing rib 121h may connect the rotor frame pin 121g and the outer wall 121e. The pin reinforcing rib 121h may have the same height as the rotor frame pin 121g in a direction parallel to an axial direction of the rotation shaft. The rotor frame pin 121g located relatively close to the outer wall 121e and the pin reinforcing ribs therearound are inserted into the rotor core slot 123e of the rotor core.

When the outer ring 125 to be described later is located inside the outer wall 121e, the pin reinforcing rib 121h is connected to the outer wall along an axial direction of the rotation shaft. If the outer ring 125 is in close contact with an outer end of the rotor core segment 123, the pin reinforcing rib 121h may be connected to the outer wall 121e through the first end base 121c.

When the rotor frame 121 is formed by insert injection molding, the rotor frame pin 121g and the pin reinforcing rib 121h may be defined in a region filled with the molten injection material. Accordingly, the rotor frame pin 121g located at a position relatively far from the outer wall 121e may have a shape corresponding to the rotor core hole 123d of the rotor core segment 123. In addition, the rotor frame pin 121g located relatively close to the outer wall 121e and the pin reinforcing rib 121h therearound have a shape corresponding to the rotor core slot 123e.

The rotor frame hole 121i may be defined at a position facing the rotor frame 121 along a direction parallel to an axial direction of the rotation shaft. When the rotor frame pin 121g is disposed in the first end base 121c, the rotor frame hole 121i may be defined in the second end base 121d. In some examples, when the rotor frame pin 121g is disposed in the second end base 121d, the rotor frame hole 121i may be defined in the first end base 121c.

The rotor frame hole 121i may be defined at a position where the mold pin has been disposed originally during insert injection molding for producing the rotor 120. Even though the molten raw material for insert injection molding is filled in the mold, the molten injection material is only filled above or below the mold pin, and molten injection material cannot exist at the position where the mold pin exists. Therefore, the rotor frame pin 121g and the pin reinforcing rib remain in a region where the molten injection material has existed as a result of insert injection molding, and the rotor frame hole 121i remains in a region where the mold pin has existed.

The rotor 120 may be disengaged from the mold pin when the rotor 120 that has completed insert injection molding is separated from the mold. It will be understood that a distance between the rotor frame pin 121g and the rotor frame hole 121i corresponds to a length of the mold pin. It will be understood that the sum of a length of the mold pin and a length of the rotor frame pin 121g is a distance between the first end base 121c and the second end base 121d. Accordingly, a length of the rotor frame pin 121g in a direction parallel to an axial direction of the rotation shaft is smaller than that between the first end base 121c and the second end base 121d.

The plurality of rotor core fixing jig holes 121j may be defined in either one of the first end base 121c and the second end base 121d. The plurality of rotor core fixing jig holes 121j may be arranged along a circumference between the outer wall 121e and the inner pillar 121f. The plurality of rotor core fixing jig holes 121j may be defined at positions spaced apart from each other.

A rotor core fixing jig for fixing the plurality of rotor core segments 123 may be formed in a mold for producing the rotor 120. A rotor core fixing jig closely adheres each of the rotor core segments 123 seated on a mold pin to the mold pin along a direction parallel to an axial direction of the rotation shaft. Therefore, each of the rotor core segments 123 may be fixed along this direction.

Even though the molten raw material for insert injection molding is filled in the mold, the molten raw material may not exist at the position where the rotor core fixing jig exists. Therefore, as a result of insert injection molding, the rotor core fixing jig hole 121j may remain.

The permanent magnet fixing jig hole 121k may be located at a boundary between the first end base 121c and the inner pillar 121f or formed at a boundary between the second end base 121d and the inner pillar 121f. The permanent magnet fixing jig holes 121k may be disposed at positions corresponding to the respective permanent magnets 124 in a radial direction of the rotor frame 121.

A permanent magnet fixing jig for fixing the plurality of permanent magnets 124 may be formed on a mold for producing the rotor 120. The permanent magnet fixing jig closely adheres each of the permanent magnets 124 seated on a mold pin to the mold pin along a direction parallel to an axial direction of the rotation shaft. Therefore, each of the permanent magnets 124 may be fixed along this direction.

In some examples, where the molten raw material for insert injection molding is filled in the mold, the molten raw material may not exist at the position where the permanent magnet fixing jig exists. Therefore, as a result of insert injection molding, the permanent magnet fixing jig hole 121$k$ may remain. The position of the permanent magnet 124 may be visually checked from an outer side of the rotor frame 121 through the permanent magnet fixing jig hole 121$k$ since the permanent magnet 124 is visually exposed through the permanent magnet fixing jig hole 121$k$.

In some examples, where the head 123$b$ is disposed on the rotor core segment 123, an inclination of the permanent magnet 124 in a direction of the rotation shaft in the mold may be prevented. Accordingly, the permanent magnet fixing jig hole 121$k$ is not formed at a boundary between the first end base 121$c$ and the outer wall 121$e$ or at a boundary between the second end base 121$d$ and the outer wall 121$e$.

In some implementations, the outer ring 125 may surround an outer end of the plurality of rotor core segments 123 and an outer end of the plurality of permanent magnets 124. The outer ring 125 is formed in an annular shape along a circumferential direction of the rotor 120, and has a predetermined length (height) along a direction parallel to an axial direction of the rotation shaft. The length (height) of the outer ring 125 may be constant along the circumference.

The outer ring 125 may be disposed in close contact with the outer end of the plurality of rotor core segments 123 and the outer end of the plurality of permanent magnets 124. The outer end of the rotor core segment 123 refers to an outer end of the protrusion 123$c$. In this case, the outer wall 121$e$ of the rotor frame 121 surrounds the outer ring 125. Such a structure is shown in FIG. 2.

The rotor frame 121 fixes a plurality of rotor core segments 123, a plurality of permanent magnets 124, and an outer ring 125 to integrate the plurality of rotor core segments 123, the plurality of permanent magnets 124, and the outer ring 125. The rotor frame 121 is configured to restrain the plurality of rotor core segments 123, the plurality of permanent magnets 124, and the outer ring 125 in axial and radial directions.

For instance, the first end base 121$c$ of the rotor frame 121 surrounds a first end of the plurality of rotor core segments 123, a first end of the plurality of permanent magnets 124, and a first end of the outer ring 125 in a direction (height direction) parallel to the axial direction. The second end base 121$d$ surrounds a second end of the plurality of rotor core segments 123, a second end of the plurality of permanent magnets 124, and a second end of the outer ring 125 in a direction parallel to the axial direction. With reference to the height direction as shown in the drawing, it will be understood that the first end is referred to as a lower end, and the second end is referred to as an upper end. Accordingly, the plurality of rotor core segments 123, the plurality of permanent magnets 124, and the outer ring 125 are fixed in a direction parallel to an axial direction of the rotation shaft.

Furthermore, the outer wall 121$e$ of the rotor frame 121 surrounds an outer end of the plurality of rotor core segments 123, an outer end of the plurality of permanent magnets 124, and an outer end of the outer ring 125 in a radial direction of the rotor 120. Accordingly, the plurality of rotor core segments 123, the plurality of permanent magnets 124, and the outer ring 125 are fixed in a radial direction of the rotor frame 121.

When the outer ring 125 integrated with the other elements of the rotor 120 is introduced by the rotor frame 121, the structural strength of the rotor frame 121, and moreover, the structural strength of the motor 100, may be increased, thereby increasing a safety factor for rotational stiffness.

The rotor core segment 123 formed by stacking a plurality of single electrical steel sheets along the axial direction concentrates a magnetic flux generated by the permanent magnets 124 to suppress the leakage of the magnetic flux. If the outer ring 125 in close contact with an outer end of the plurality of rotor core segments 123 is formed of a magnetic material, the magnetic flux leaks to the outer ring 125. In this regard, the outer ring 125 may be formed of a non-magnetic material (a non-magnetic substance).

The magnetic field characteristic of the motor 100 is affected by a relative permeability value. The relative permeability of the non-magnetic material is close to 1, and the relative permeability of the magnetic material is much larger than 1. In some implementations, the outer ring 125 may have a relative permeability of 1 to 1.05. When the relative permeability of the outer ring 125 is 1.05 or less, there is no change in the magnetic field characteristic of the motor 100, and the performance of the motor 100 may not deteriorate even when the outer ring 125 is introduced.

In some implementations, in order to increase the structural strength of the rotor frame 121, the outer ring 125 may have a tensile strength of 600 MPa or more. For example, the outer ring 125 may have a tensile strength of 700 MPa. Whether or not to increase the structural strength of the rotor frame 121 may be determined by the concept of a safety factor, which is proportional to the tensile strength. Therefore, as the tensile strength of the outer ring 125 increases, the safety factor increases. The description of the safety factor will be described in more detail later.

Various types of stainless steels have a specific permeability of about 1.02. Furthermore, there are various types of stainless steels having a tensile strength of 600 MPa or more, and moreover, 700 MPa or more. Therefore, when a type satisfying the relative permeability condition and the tensile strength condition is selected among stainless steels, and a type having excellent economic efficiency and productivity is selected from the stainless steels, the selected type of stainless steel is used as a material of the outer ring 125.

Figure 5:
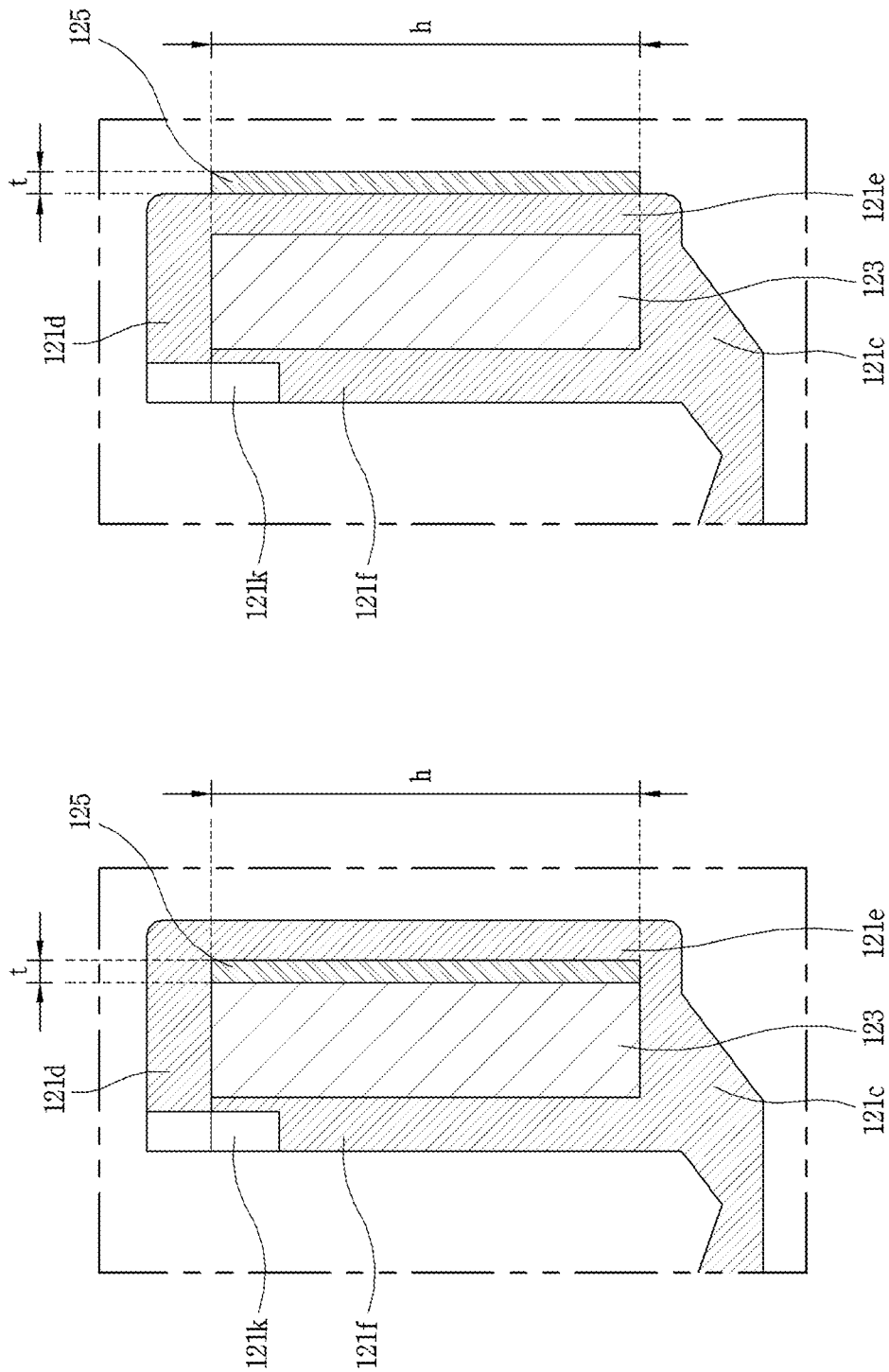
FIGS. 5A and 5B are cross-sectional views of examples of the portion V illustrated in FIG. 2.

Next, a size of the outer ring 125 will be described with reference to FIG. 5.

Next, a size of the outer ring 125 will be described with reference to FIGS. 5A and 5B.

FIGS. 5A and 5B are cross-sectional views of examples of a portion V illustrated in FIG. 2.

The outer ring 125 is formed in an annular shape to surround the plurality of rotor core segments 123 and the plurality of permanent magnets 124 in a radial direction of the rotor frame 121. The outer ring 125 is disposed between the plurality of rotor core segments 123 and the rotor frame 121 in a radial direction of the rotor frame 121. In particular, as shown in FIG. 5A, the outer ring 125 is disposed between the plurality of rotor core segments 123 and the outer wall 121$e$ in the sense that the outer wall 121$e$ of the rotor frame 121 surrounds the outer ring 125. Furthermore, the outer ring 125 is disposed between the plurality of permanent magnets 124 and the rotor frame 121 in a radial direction of the rotor frame 121.

However, the position of the outer ring 125 is not necessarily limited to this position, and for instance, the outer ring 125 may be disposed inside the outer wall 121*e* (see FIG. 5A) or at a position surrounding the outer wall 121*e* (see FIG. 5B). In this case, an inner circumferential surface of the outer wall 121*e* is in close contact with an outer end of the plurality of rotor core segments 123 and an outer end of the plurality of permanent magnets 124.

The size of the outer ring 125 will be described by a thickness (t) with respect to a radial direction of the rotor frame 121 and a length (h) with respect to a direction (vertical direction in FIGS. 5A and 5B) parallel to the axial direction.

In some implementations, the thickness (t) of the outer ring 125 maybe 0.5 mm to 3.5 mm. When the thickness (t) of the outer ring 125 is less than 0.5 mm, the effect of complementing the structural strength by the outer ring 125 may be insufficient. When a thickness (t) of the outer ring 125 exceeds 3.5 mm, the excess thickness may cause a size of the rotor frame 121, and moreover, a size of the motor 100, to increase. In some cases, the outer ring 125 may be formed by winding a band having a first end 125*a* and a second end 125*b* in an annular shape as will be described later in FIGS. 7A and 7B. When the thickness (t) of the outer ring 125 exceeds 3.5 mm, it may cause difficulty in production.

In some implementations, not to affect the inherent performance of the motor 100 even when the outer ring 125 is introduced, the size of the motor 100 may not be increased due to the outer ring 125.

In some examples, a ratio (h/A) of a length (h) of the outer ring 125 to a length (A) of the rotor core segment 123 in a direction parallel to an axial direction of the rotation shaft is 0.3 to 1.5.

When the ratio (h/A) is less than 0.3, the length of the outer ring 125 may be smaller than that of the rotor core segment 123 in a direction parallel to an axial direction of the rotation shaft, and the effect of complementing the structural strength of the rotor 120 is insufficient.

When the ratio (h/A) exceeds 1.5, the length of the outer ring 125 may be excessively larger than that of the rotor core segment 123. In this case, the size of the rotor frame 121, and moreover, the size of the motor 100, may increase unnecessarily.

In some implementations, the ratio (h/A) of the length (h) of the outer ring 125 with respect to the length (A) of the rotor core segment 123 may be 0.66 to 1. The structural strength reinforcing effect (safety factor) of the rotor 120 by the outer ring 125 is linearly proportional to the ratio (h/A), but the slope of a graph showing the proportional relationship is decreased from the boundary of 0.66. Therefore, in the range of 0.66 or less, the effect of reinforcing the structural strength of the rotor 120 by the outer ring 125 is relatively large, and in the range of 0.66 or more, the effect of reinforcing the structural strength of the rotor 120 by the outer ring 125 is relatively small. In this regard, the ratio (h/A) may be at least 0.66 or more.

The fact that the ratio (h/A) between the length (h) of the outer ring 125 and the length (A) of the rotor core segment 123 is 1 denotes that the length (h) of the outer ring 125 and the length (h) of the rotor core segment 123 (A) are the same. When the rotor frame 121 in the absence of the outer ring 125 and the rotor frame 121 in the presence of the outer ring 125 are compared with each other, the length of the outer wall 121*e* starts to increase along a direction parallel to an axial direction of the outer wall 121*e* from the moment when the ratio (h/A) exceeds 1. In some implementations, in order to maintain the length of the outer wall 121*e* as it is even when the outer ring 125 is introduced, the ratio (h/A) may be less than or equal to one.

In some examples, damage to the rotor frame 121 during the rotation of the rotation shaft of the motor 100 may be analyzed based on the safety factor. For example, when the safety factor is increased due to the introduction of the outer ring 125, it denotes that damage to the rotor frame 121 is small.

The safety factor may be defined as a ratio (B/C) of the tensile strength (B) to the stress (C) applied to the rotor frame 121 when the motor 100 is operated. When a tensile strength of the rotor frame 121 is large, the safety factor is high, and when a stress applied to the rotor frame 121 is large, the safety factor is low. As a result of experimentally analyzing the result of introducing the outer ring 125 according to the present disclosure in comparison with the conventional structure without the outer ring 125, the safety factor of the rotor frame 121 is dramatically increased up to four times or more. Furthermore, in spite of the introduction of the outer ring 125, the inherent performance of the motor 100 was not affected.

On the other hand, the plurality of rotor core segments 123, the plurality of permanent magnets 124, and the outer ring 125 are integrated with the rotor frame 121 by insert injection molding. The process will be described with reference to FIG. 6.

Figure 6:
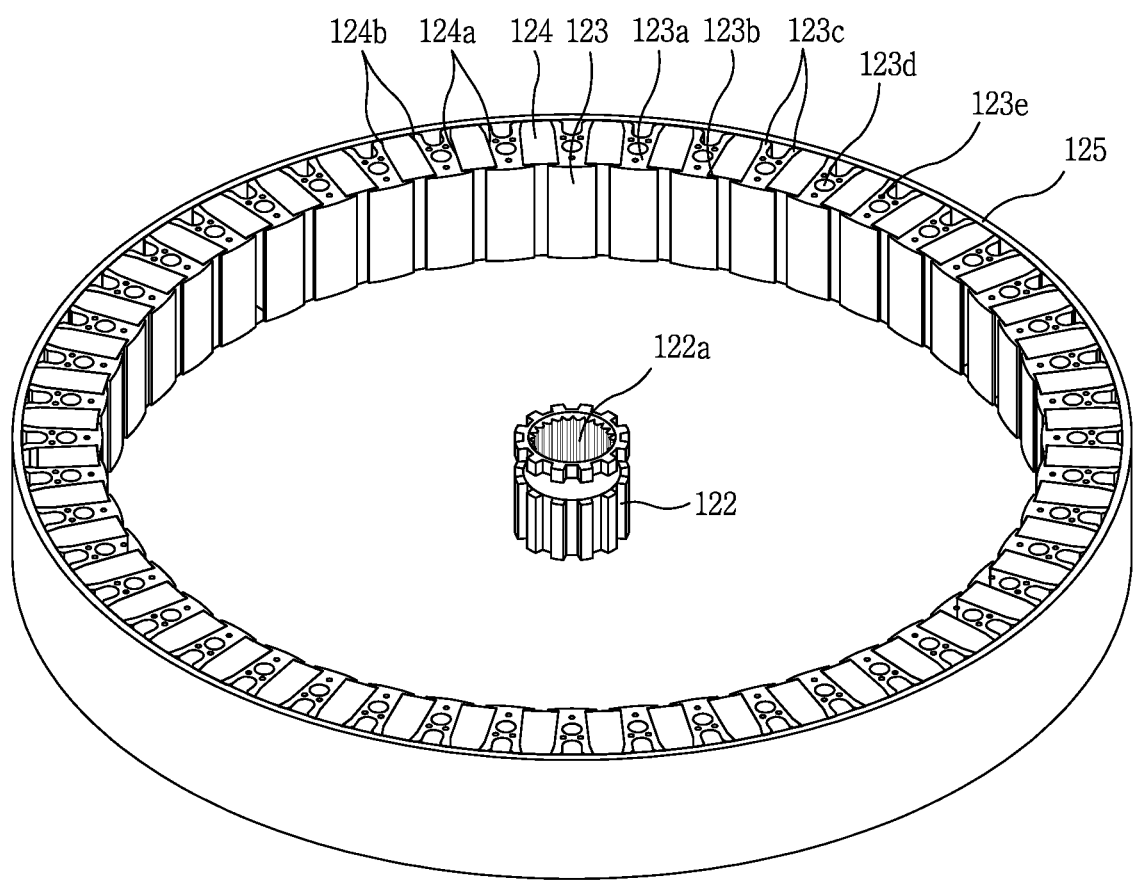
FIG. 6 is a perspective view showing example positions of rotor core segments, permanent magnets, an outer ring, and a bushing prior to an insert injection process, and an example coupling state prior to insert injection molding.

FIG. 6 is a perspective view showing the positions of the rotor core segments 123, the permanent magnets 124, the outer ring 125, and the bushing 122 prior to insert injection molding.

Injection molding is a type of method of molding a resin, and refers to a method of cooling and solidifying a molten raw material in a mold at a high pressure to produce a molded article having a shape corresponding to the mold. A molded article produced by injection molding is referred to as an injection product.

Insert injection molding refers to a method of injecting an insert component together with a molten raw material into a mold to produce a molded article. The injection product has a shape corresponding to a mold, and is produced while an insert component is integrated with an injection product inside the injection product.

The plurality of rotor core segments 123 and the plurality of permanent magnets 124 are arranged alternately one by one along an inner surface of the outer ring 125 in the mold prior to insert injection molding. More specifically, the plurality of rotor core segments 123 are arranged at specified positions of the mold so as to be spaced apart from each other along a predetermined circumference. Furthermore, the permanent magnets 124 are arranged one by one between the two rotor core segments 123.

The outer ring 125 may be press-fitted along an axial direction to be in close contact with the outer end of the plurality of rotor core segments 123 and the outer end of the plurality of permanent magnets 124. Furthermore, the bushing 122 is disposed in the center of a region surrounded by the plurality of rotor core segments 123 and the plurality of permanent magnets 124 in the mold.

When a molten raw material is injected into the mold while the plurality of rotor core segments 123, the plurality of permanent magnets 124, the outer ring 125 and the bushing 122 are arranged in the mold as described above to perform an insert injection molding process, the rotor 120 illustrated in FIG. 2 is produced.

Next, the structure and manufacturing process of the outer ring 125 that is press-fitted into an outer end of the plurality of rotor core segments 123 and an outer end of the plurality of permanent magnets 124 will be described with reference to FIGS. 7A and 7B. The manufacture of the outer ring 125 may precede insert injection molding.

Figure 7A:
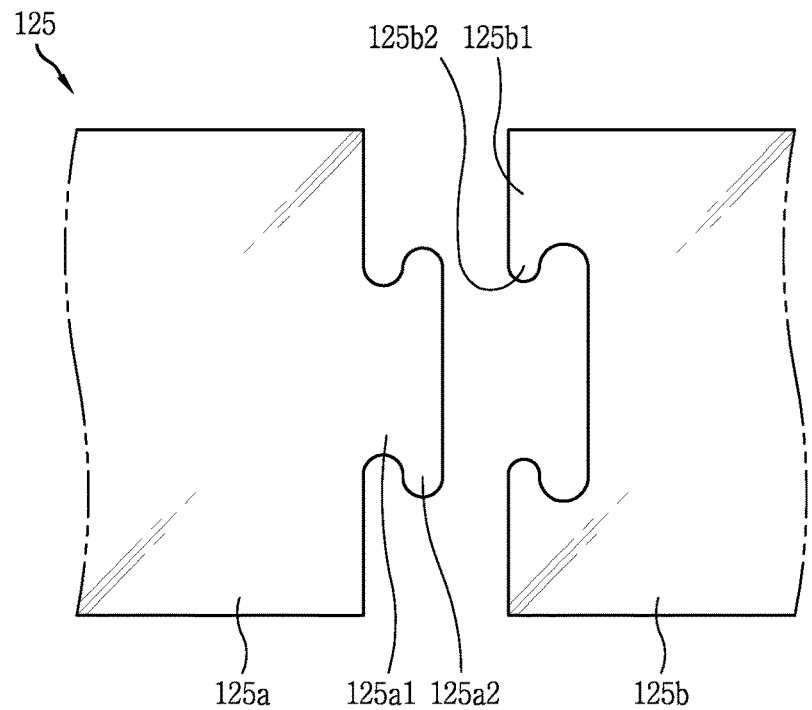
FIG. 7A is a conceptual view showing an example outer ring prior to connecting a first end and a second end of the outer ring.
Figure 7B:
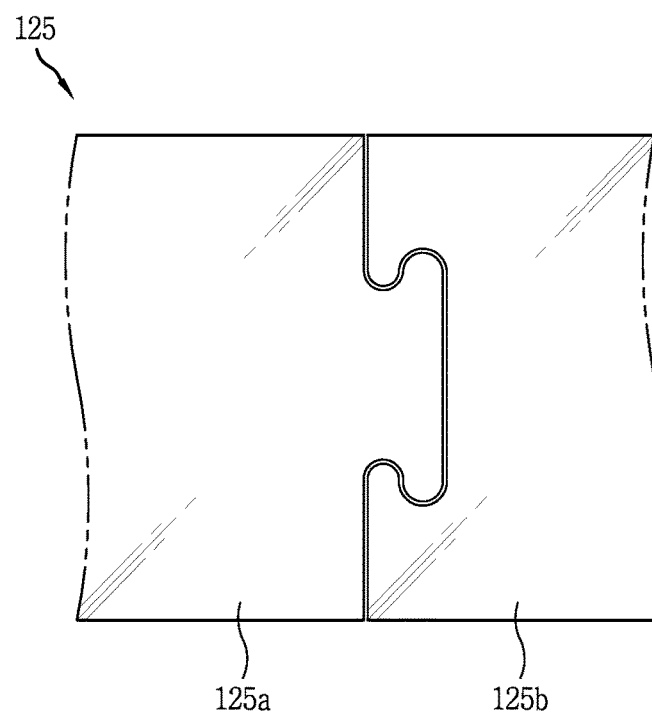
FIG. 7B is a conceptual view showing the outer ring of FIG. 7A subsequent to connecting the first end and the second end of the outer ring.

FIG. 7A is a conceptual view prior to connecting a first end 125a and a second end 125b of the outer ring 125. FIG. 7B is a conceptual view subsequent to connecting the first end 125a and the second end 125b of the outer ring 125.

The outer ring 125 may be formed by winding a band having the first end 125a and the second end 125b in an annular shape. When the outer ring 125 is disposed on an inner side of the outer wall 121e of the rotor frame 121, the outer ring 125 is formed by winding the band to an outer end of the plurality of rotor core segments 123 and an outer end of the plurality of permanent magnets 124. If the outer ring 125 is disposed on an outer side of the outer wall 121e of the rotor frame 121, the outer ring 125 is formed by winding on an outer circumferential surface of the outer wall 121e.

The wound first end 125a and second end 125b of the outer ring 125 are welded to each other. Accordingly, a welding portion may be located between the first end 125a and the second end 125b of the outer ring 125.

The outer ring 125 may have a structure capable of complementing a physical bonding force by welding. For example, as illustrated in FIGS. 7A and 7B, the first end 125a and the second end 125b have circumferential protruding portions 125a1, 125b1 and intersectional protruding portions 125a2, 125b2, respectively.

The circumferential protruding portion 125a1 of the first end 125a may protrude in a circumferential direction of the outer ring 125 toward the second end 125b. Furthermore, the intersectional protruding portion 125a2 of the first end 125a may protrude in a direction intersecting the circumferential direction of the outer ring 125 from the circumferential protruding portion 125a1 of the first end 125a. When the intersectional direction is orthogonal to the circumferential direction, the intersectional direction is a direction parallel to an axial direction of the rotation shaft.

The circumferential protruding portion 125b1 of the second end 125b may protrude in a circumferential direction of the outer ring 125 toward the first end 125a. Furthermore, the intersectional protruding portion 125b2 of the second end 125b may protrude in a direction intersecting the circumferential direction of the outer ring 125 from the circumferential protruding portion 125b1 of the second end 125b. When the intersectional direction is orthogonal to the circumferential direction, the intersectional direction is a direction parallel to an axial direction of the rotation shaft.

In order to couple the first end 125a and the second end 125b of the outer ring 125 to each other, the first end 125a may be configured to accommodate the second end 125b or the second end 125b may be configured to accommodate the first end 125a. For instance, as illustrated in the drawing, only one circumferential protruding portion 125a1 of the first end 125a may protrude from the first end 125a while two circumferential protrusions 125b1 of the second end 125b may protrude from the second end 125b. Two intersectional protruding portions 125a2 of the first end 125a are formed on both sides opposite to each other, while one intersectional protruding portion 125b2 of the second end 125b may be disposed on each circumferential protruding portion 125b1 of the second end 125b.

With this structure, the intersectional protruding portion 125a2 of the first end 125a and the intersectional protruding portion 125b2 of the second end 125b are coupled to each other in a staggered manner. For example, the intersectional protruding portion 125a2 of the first end 125a and the intersectional protruding portion 125b2 of the second end 125b may overlap in the circumferential direction and a direction intersection the circumferential direction. Accordingly, the first end 125a and the second end 125b may be restrained to each other in a circumferential direction of the outer ring 125. When the outer ring 125 in which the first end 125a and the second end 125b are restrained to each other is press-fitted into an outer end of the plurality of rotor core segments 123 and an outer end of the plurality of permanent magnets 124, a primary preparation for carrying out the present disclosure is completed. Thereafter, the rotor 120 is produced by the insert injection molding described above with reference to FIG. 6.

Figure 8:
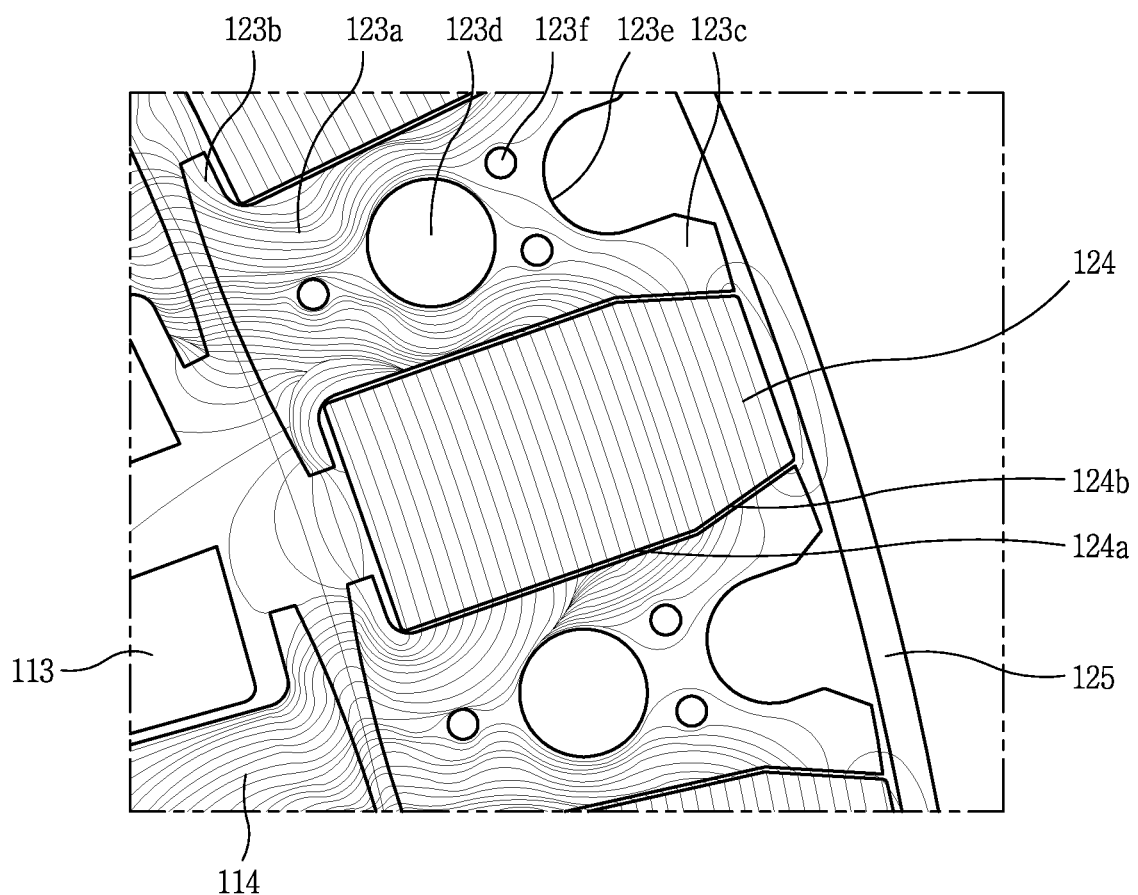
FIG. 8 is a conceptual view showing an example of flow of magnetic flux.

FIG. 8 is a conceptual view showing the flow of magnetic flux to describe the effect of the present disclosure.

A magnetic flux generated from the first working surface 124a and the second working surface 124b of the permanent magnet 124 may be concentrated by the rotor core segment 123 to flow toward the stator 110. However, if the outer ring 125 is formed of a magnetic material, then the magnetic flux flowing toward the stator 110 leaks out of the rotor 120, thereby deteriorating the performance of the motor. Accordingly, it has been described above that the outer ring 125 may be formed of a non-magnetic material.

In a simulation of flow of the magnetic flux, the outer ring may not affect the flow of the magnetic flux as illustrated in FIG. 8. In particular, as long as the outer ring is made of a non-magnetic material, it may not affect the flow of the magnetic flux irrespective of the detailed material, size, position, and the like, of the outer ring. Therefore, when the outer ring 125 is introduced into the rotor, the structural strength of the rotor 120 may be improved without affecting the performance of the motor.

In FIG. 8, the reference numerals 113, 114, 123a, 123b, 123c, 123d, and 123f denote a coil, teeth, a body, a head, a protrusion, a hole, a rotor core slot, and a mac, respectively.

The configurations and methods according to the above-described embodiments will not be limited to the foregoing motor, and all or part of each embodiment may be selectively combined and configured to make various modifications thereto.

In some implementations, the outer ring may surround a plurality of rotor core segments and a plurality of permanent magnets without depending on a plurality of fastening members, thereby improving the structural strength of a rotor without causing performance degradation or size increase of the motor.

In some implementations, the outer ring may be integrated with a plurality of rotor core segments and a plurality of permanent magnets by a rotor frame. As parts constituting the rotor are integrated, a structural strength capable of preventing the rotor from being damaged even during a high-speed operation of the motor may be secured. Moreover, the integration of the parts constituting the rotor may fundamentally solve a rotor breakage problem due to an insufficient physical coupling force between the individual parts.

The outer ring may be press-fitted into an outer end of the plurality of rotor core segments and an outer end of the plurality of permanent magnets, and thus an additional fastening process is not required other than the press-fitting. Accordingly, the outer ring does not cause productivity deterioration of the rotor. In particular, when the rotor is produced by insert injection molding, the productivity of the rotor may be further improved.

In addition, the present disclosure proposes a structure in which a rotor core segment and a permanent magnet can be stably mounted in place on a rotor frame during the process of producing the rotor, such as a rotor frame pin, a rotor frame hole, and the like, and as a result, the parts of the produced rotor may securely maintain a coupling state.

What is claimed is:

1. A motor comprising:
    a stator; and
    a rotor rotatably disposed on an outer side of the stator, wherein the rotor comprises:
        a plurality of rotor core segments arranged along a circumferential direction of the rotor on the outer side of the stator and spaced apart from one another to define a plurality of permanent magnet arrangement slots between the plurality of rotor core segments,
        a plurality of permanent magnets inserted into the plurality of permanent magnet arrangement slots, respectively, wherein the plurality of rotor core segments and the plurality of permanent magnets are alternately arranged along the circumferential direction of the rotor,
        a rotor frame that couples the plurality of rotor core segments and the plurality of permanent magnets to each other, and
        an outer ring that is made of a non-magnetic material and that surrounds an outer end of the plurality of rotor core segments and an outer end of the plurality of permanent magnets,
    wherein the outer ring is in contact with the outer end of the plurality of rotor core segments and the outer end of the plurality of permanent magnets, and
    wherein the rotor frame surrounds the outer ring,
    wherein the rotor frame is connected to a rotation shaft that passes through a region surrounded by the stator,
    wherein the outer ring has an upper end and a lower end opposite to the upper end in an axial direction of the rotation shaft, and
    wherein the rotor frame extends along the axial direction of the rotation shaft to thereby cover the upper end and the lower end of the outer ring.

2. The motor of claim 1, wherein a relative permeability of the outer ring is 1 to 1.05.

3. The motor of claim 1, wherein a thickness of the outer ring between an inner circumferential surface and an outer circumferential surface of the rotor frame is 0.5 mm to 3.5 mm.

4. The motor of claim 1, wherein the rotation shaft passes through the stator in the axial direction, and
    wherein a ratio of a length of the outer ring in the axial direction with respect to a length of the plurality of rotor core segments in the axial direction is 0.3 to 1.5.

5. The motor of claim 4, wherein the ratio of the length of the outer ring with respect to the length of the plurality of rotor core segments in the axial direction is 0.66 to 1.

6. The motor of claim 1, wherein the outer ring comprises a band that has a first end and a second end and that is wound along the outer end of the plurality of rotor core segments and the outer end of the plurality of permanent magnets.

7. The motor of claim 6, wherein the first end and the second end of the band are coupled to each other by welding.

8. The motor of claim 6, wherein each of the first end and the second end of the band comprises:
    a circumferential protruding portion that protrudes in a circumferential direction of the outer ring toward a mating end among the first end and the second end; and
    an intersectional protruding portion that protrudes from the circumferential protruding portion in a direction intersecting the circumferential direction of the outer ring.

9. The motor of claim 8, wherein the intersectional protruding portion of the first end and the intersectional protruding portion of the second end are coupled to each other and overlap each other in the circumferential direction of the outer ring and in the direction intersecting the circumferential direction of the outer ring.

10. The motor of claim 1, wherein the plurality of rotor core segments, the plurality of permanent magnets, and the outer ring are integrated with the rotor frame by injection molding.

11. The motor of claim 1, wherein the plurality of rotor core segments have upper ends and lower ends opposite to the upper ends of the plurality of rotor core segments in the axial direction of the rotation shaft,
    wherein the plurality of permanent magnets have upper ends and lower ends opposite to the upper ends of the plurality of permanent magnets in the axial direction of the rotation shaft, and
    wherein the rotor frame covers the upper ends and lower ends of the plurality of rotor core segments and the upper ends and lower ends of the plurality of permanent magnets in the axial direction of the rotation shaft.

12. The motor of claim 11, wherein each of the plurality of rotor core segments defines a rotor core hole or a rotor core slot, the rotor core hole or the rotor core slot being configured to receive a portion of the rotor frame,
    wherein the rotor frame comprises a rotor frame pin inserted into the rotor core hole or the rotor core slot along the axial direction of the rotation shaft, and
    wherein the rotor frame defines a rotor frame hole at a position facing the rotor frame pin in the axial direction of the rotation shaft.

13. The motor of claim 1, wherein each of the plurality of rotor core segments comprises:
    a body that faces two adjacent magnets of the plurality of permanent magnets in the circumferential direction of the rotor;
    a head that protrudes from an inner end of the body to both sides along the circumferential direction of the rotor; and
    core protrusions that protrude radially outward from an outer end of the body and that are spaced apart from each other in the circumferential direction of the rotor to thereby define a rotor core slot between the core protrusions, and
    wherein each of the plurality of permanent magnet arrangement slots is defined by the bodies, the heads, and the core protrusions of adjacent rotor core segments of the plurality of rotor core segments, the adjacent rotor core segments being disposed on both sides of one of the plurality of permanent magnets.

14. The motor of claim 1, wherein each of the plurality of permanent magnets is disposed between two adjacent rotor core segments of the plurality of rotor core segments arranged along the circumferential direction of the rotor.

15. A motor comprising:
    a stator; and
    a rotor rotatably disposed on an outer side of the stator, wherein the rotor comprises:
        a plurality of rotor core segments arranged along a circumferential direction of the rotor on the outer side of the stator and spaced apart from one another to define a plurality of permanent magnet arrangement slots between the plurality of rotor core segments, a plurality of permanent magnets inserted into the plurality of permanent magnet arrangement slots, respectively, wherein the plurality of rotor core segments and the plurality of permanent magnets are alternately arranged along the circumferential direction of the rotor, a rotor frame that couples the plurality of rotor core segments and the plurality of permanent magnets to each other, and an outer ring that is made of a non-magnetic material and that surrounds an outer end of the plurality of rotor core segments and an outer end of the plurality of permanent magnets, wherein the rotor frame is in contact with the outer end of the plurality of rotor core segments and the outer end of the plurality of permanent magnets, and wherein the outer ring surrounds the rotor frame.

16. A motor comprising:

a stator; and a rotor rotatably disposed at an outer side of the stator, wherein the rotor comprises:

a plurality of rotor core segments arranged along a circumferential direction of the rotor on the outer side of the stator and spaced apart from one another to define a plurality of permanent magnet arrangement slots between the plurality of rotor core segments, a plurality of permanent magnets inserted into the plurality of permanent magnet arrangement slots, respectively, each of the plurality of permanent magnets being disposed between two adjacent rotor core segments of the plurality of rotor core segments arranged along the circumferential direction of the rotor, an outer ring that surrounds an outer end of the plurality of rotor core segments and an outer end of the plurality of permanent magnets, and a rotor frame that surrounds the outer ring, that is coupled to the plurality of rotor core segments and the plurality of permanent magnets, and that is in contact with an outer surface of the outer ring, wherein an inner surface of the outer ring is in contact with the outer end of the plurality of rotor core segments and the outer end of the plurality of permanent magnets, wherein the rotor frame is connected to a rotation shaft that passes through a region surrounded by the stator, wherein the outer ring has an upper end and a lower end opposite to the upper end in an axial direction of the rotation shaft, and wherein the rotor frame extends along the axial direction of the rotation shaft to thereby cover the upper end and the lower end of the outer ring.

17. The motor of claim 16, wherein the rotor frame comprises a base that extends radially inward of the outer ring to thereby cover upper ends or lower ends of the plurality of rotor core segments.

* * * * *